(12) United States Patent
Talukder et al.

(10) Patent No.: US 9,037,550 B2
(45) Date of Patent: May 19, 2015

(54) DETECTING INCONSISTENT DATA RECORDS

(75) Inventors: Nilothpal Talukder, Doha (QA); Mohamed Yakout, Doha (QA); Mourad Ouzzani, Doha (QA); Ahmed Elmagarmid, Doha (QA)

(73) Assignee: QATAR FOUNDATION, Doha (QA)

( * ) Notice: Subject to any disclaimer, the term of this patent is extended or adjusted under 35 U.S.C. 154(b) by 165 days.

(21) Appl. No.: 13/434,647

(22) Filed: Mar. 29, 2012

(65) Prior Publication Data

US 2013/0226879 A1 Aug. 29, 2013

(30) Foreign Application Priority Data

Feb. 28, 2012 (GB) .................................. 1203420.3

(51) Int. Cl.
*G06F 7/00* (2006.01)
*G06F 17/00* (2006.01)
*G06F 17/30* (2006.01)
*G06F 21/60* (2013.01)

(52) U.S. Cl.
CPC .... *G06F 17/30303* (2013.01); *G06F 17/30286* (2013.01); *G06F 21/60* (2013.01)

(58) Field of Classification Search
None
See application file for complete search history.

(56) References Cited

U.S. PATENT DOCUMENTS

| 2007/0053507 | A1 | 3/2007 | Smaragdis et al. | |
| 2008/0021899 | A1* | 1/2008 | Avidan et al. | 707/6 |
| 2009/0287721 | A1* | 11/2009 | Golab et al. | 707/100 |
| 2010/0250596 | A1* | 9/2010 | Fan et al. | 707/776 |
| 2011/0138312 | A1* | 6/2011 | Yeh et al. | 715/771 |

FOREIGN PATENT DOCUMENTS

IE 20020648 A1 3/2003

OTHER PUBLICATIONS

Mohamed Yaout "Efficient Private Record Linkage", Mar. 29, 2009, a Engineering, 2009. ICDE '09. IEEE 25th International Conference, pp. 1283-1286.*
GB1203420.3 Examination Report dated Jun. 20, 2012.

* cited by examiner

*Primary Examiner* — Loan T Nguyen
(74) *Attorney, Agent, or Firm* — Mossman Kumar & Tyler PC (57) ABSTRACT

A computer-implemented method for detecting a set of inconsistent data records in a database including multiple records, comprises selecting a data quality rule representing a functional dependency for the database, transforming the data quality rule into at least one rule vector with hashed components, selecting a set of attributes of the database, transforming at least one record of the database selected on the basis of the selected attributes into a record vector with hashed components, computing a dot product of the rule and record vectors to generate a measure representing violation of the data quality rule by the record.

11 Claims, 7 Drawing Sheets

| id | Name | CC | Zip | Street | City | State |
|---|---|---|---|---|---|---|
| $t_1$ | Shawn | 44 | EH4 8LE | Mayfield | EDI | n/a |
| $t_2$ | Dave | 44 | EH4 8LE | Mayfield | EDI | n/a |
| $t_3$ | Brian | 44 | EH4 8LE | Mayfield | EDI | n/a |
| $t_4$ | Bret | 44 | EH4 8LE | Princess | EDI | n/a |
| $t_5$ | Alice | 44 | EH2 4HF | Princess | EDI | n/a |
| $t_6$ | Ray | 44 | EH2 4HF | Princess | EDI | n/a |
| $t_7$ | Rachel | 44 | EH2 4HF | Princess | EDI | n/a |
| $t_8$ | Ron | 01 | 46825 | Bell Avenue | Fort Wayne | IN |
| $t_9$ | Zach | 01 | 46825 | Bell Avenue | Fort Wayne | IN |
| $t_{10}$ | Jim | 01 | 47906 | Northwestern | West Lafayette | IN |
| $t_{11}$ | Joe | 01 | 47906 | State | West Lafayette | NY |

$\phi_1$:

| CC | Zip ∥ Street |
|---|---|
| 44 | – |

$\phi_2$:

| CC | Zip ∥ City | State |
|---|---|---|
| 01 | 46825 | – |
| 01 | 47906 | – |

$r_1$: (CC, Zip → Street, $\{44, -\|-\}$)

$r_2$: (CC, Zip → City, State, $\{01, 46825\|FortWayne, IN\}$)
$r_3$: (CC, Zip → City, State, $\{01, 47906\|WestLafayette, IN\}$)

Figure 1

Merged Pattern Tableaux for CFDs $\phi_1$ and $\phi_2$

|       | CC | Zip   | Street | City           | State |
|-------|----|-------|--------|----------------|-------|
| $r_1$ | 44 | -     | -      | @              | @     |
| $r_2$ | 01 | 46825 | @      | Fort Wayne     | IN    |
| $r_3$ | 01 | 46906 | @      | West Lafayette | IN    |

Tableau $T_\Sigma^x$

Canonical CFD rules $r_2$ and $r_3$

|          | CC | Zip   | Street | City           | State |
|----------|----|-------|--------|----------------|-------|
| $r'_2$   | 01 | 46825 | @      | Forty Wayne    | @     |
| $r''_2$  | 01 | 46825 | @      | @              | IN    |
| $r'_3$   | 01 | 46906 | @      | West Lafayette | @     |
| $r''_3$  | 01 | 46906 | @      | @              | IN    |

Tableau $T_\Sigma^x$

| Data owner, A ($t_1, t_2 \in D$) | Rules owner, B ($r_1 \in \Sigma$) |
|---|---|
| Agreed attributes set = (CC, Zip, Street, City, State) | |
| Vector from $t_2$ | Vectors from $r_1$ |
| $V = $ [#44, #EH 4 8LE, # Mayfild, # EDI, #n/a] | $W^L = [\frac{s_3 - s_1 + 1}{\#44}, 0, 0, 0, 0]$ |
| Match Vector from $t_1$ and $t_2$ | $W^R = [\frac{s_1 - s_3}{2}, \frac{s_1 - s_2}{2}, s_1, 0, 0]$ |
| $M = [1, 1, 0, 1, 1]$ | |
| $VM = \text{concat}(V, M) = $ [#44, #EH 4 8LE, # Mayfild, # EDI, #n/a, 1, 1, 0, 1, 1] | $W = \text{concat}(W^L, W^R) = [\frac{s_3 - s_1 + 1}{\#44}, 0, 0, 0, 0, \frac{s_1 - s_3}{2} + \frac{s_1 - s_2}{2}, s_1, 0, 0]$ |
| Secure dot product, | |
| $VM \bullet W = \#44 \times \frac{s_3 - s_1 + 1}{\#44} + 0 + 0 + 0 + 0 + \frac{s_1 - s_3}{2} + \frac{s_1 - s_2}{2} + 0 + 0 + 0 = 1$ | |

$s_1$, $s_2$ and $s_3$ are random scalars
'#' symbol indicates hash of the corresponding value

599 rules owner
600 data owner
601 multiple records
603 inconsistent records
605 data quality rules
606 hashing function
607 data quality rule (FD for $DB_A$)
609 set of attributes of $DB_A$
611 rule vector
613 rule vector with hashed components
615 record from $DB_A$
617 record vector
618 record vector with hashed components
619 compute dot product
620 hashing function
621 measure of violation

Figure 7

DETECTING INCONSISTENT DATA RECORDS

CROSS REFERENCE TO RELATED APPLICATIONS

This application claims foreign priority from UK Patent Application Serial No. 1203420.3, filed 28 Feb. 2012.

BACKGROUND

Typically, data quality in a digital repository such as a database for example can be improved using data quality rules to identify records that violate those rules and modifying the data to remove the violations. Both the data being considered and the rules are generally visible to the party that is processing and cleaning the data.

In order to preserve the privacy of the data and the rules that are being used it is typical to use complex cryptographic techniques or to rely on a trusted third party. Cryptographic techniques are typically computationally expensive, and can involve introducing a third party into the system which may not be desirable in many security settings. At the same time, for a large amount of data, the speed at which data is examined for violations and subsequently repaired important.

SUMMARY

According to an example, there is provided a privacy preserving system and method for detecting inconsistent data in a database.

According to an example, there is provided a computer-implemented method for detecting a set of inconsistent data records in a database including multiple records, comprising selecting a data quality rule representing a functional dependency for the database, transforming the data quality rule into at least one rule vector with hashed components, selecting a set of attributes of the database, transforming at least one record of the database selected on the basis of the selected attributes into a record vector with hashed components, computing a dot product of the rule and record vectors to generate a measure representing violation of the data quality rule by the record. Hashed components of the vectors can be fixed-size hashcodes. The data quality rule can be a conditional functional dependency (CFD) representing a functional dependency of the database which is extended with a pattern tableau specifying conditions under which the functional dependency holds for records of the database. The CFD can be a constant CFD including rule attributes which are constants. The CFD can be a variable CFD including rule attributes which are variable. The measure representing violation of the data quality rule by the record can be provided only to the owner of the database. The record can include an attribute matching a corresponding determinant attribute for the CFD. A violation occurs if there is a disagreement between a dependent attribute of the record and the corresponding attribute of the CFD. A pair of records of the database is transformed into the record vector, the hashed components of the vector determined from a random selection of attribute values from the pair of records. In an example, the privacy of a data quality rule is preserved in the case where it is not violated by the records. Transforming the data quality rule can include generating a pair of vectors for a rule representing components for the left and right hand sides of the rule. The pair of vectors for a data quality rule which is a variable conditional functional dependency can be concatenated to form a single vector.

According to an example, there is provided a computer program embedded on a non-transitory tangible computer readable storage medium, the computer program including machine readable instructions that, when executed by a processor, implement a method for detecting a set of inconsistent data records in a database including multiple records, comprising selecting a set of attributes and generating a set of data vectors from hashcodes of the corresponding attribute values of a set of records of the database, selecting a conditional functional dependency rule and generating a rule vector from hashcodes of the rule, computing a secure dot product of the data and rule vectors to determine an inconsistent record in the database. Generating a rule vector can include generating respective vectors for constants of the left and right sides of the rule, and wherein computing a secure dot product includes computing a dot product using each such vector with the data vector for a constant CFD inconsistency detection. Generating a rule vector can include generating respective vectors for constants of the left and right sides of the rule and concatenating the vectors to provide a rules vector for a variable CFD inconsistency detection.

According to an example, there is provided a system suitable for performing a method or for executing machine readable instructions implementing a method as described herein.

BRIEF DESCRIPTION OF THE DRAWINGS

An embodiment of the invention will now be described, by way of example only, and with reference to the accompanying drawings, in which.

DETAILED DESCRIPTION

Typically, the data in a database in which it is desired to detect inconsistencies between records is available to a data quality tool in plain form. Such data may be private accordingly, if collaboration with different parties to help assess and improve its quality is desired, it will be important to maintain privacy during the process to detect the inconsistencies.

For example, in the scenario that an organization hires a data quality certifying agent to assess the quality of its data, the organization may have legal and business restrictions that prevent the sharing of some or all of its sensitive data. A specific example can be in a healthcare setting, where access to patients' medical records is typically restricted. Likewise, customer credit card information cannot be revealed to a third party agent. Complying with such legal and business requirements will be challenging as the data quality certifying agent will need to report quality problems on data that cannot be revealed. Moreover, the certifying agent would necessarily have to use a large number of data quality rules since it would be impossible to know which specific rules apply to the data. Conversely, since these rules represent an important asset for the agent due to the time and resources expended in gathering them (including the analysis of several datasets from other sources for example), it will be desirable for the agent to protect these proprietary rules as well.

In another scenario, two or more data owners may wish to collaborate to identify inconsistencies in their respective databases. Each data owner will have to first analyze their own data and generate a set of constraints found in their respective data due to correlations between values. Typically, such a rule discovery process searches for highly supported relationships between attribute values in records, and a relationship that is not supported cannot be discovered. However, there may be instances where a valid constraint that is supported in one database may not be supported in another database. For example, a business may have regional offices around the globe, each managing its own data. These data correspond to the same business domain (and they are likely to share the same schema) which strongly supports the need to collaborate in order to better assess each other's data. Accordingly, rules from any given party may be used to assess the quality of another party's data. However, an office in one country may be prevented from sharing sensitive data with another office in another country due to local legal constraints. Hence, in order to comply with regional policies, the data—even within the same organization—may have to remain private among regional offices. Moreover, it may be desirable that the rules should not be revealed as they may contain semantic relationships and information about the private data. These different owners (regional offices) would therefore need to participate in a collaborative private data cleaning process.

In an example, the scenarios can be reduced to the case of a data owner and a rules owner who is engaged in a protocol to assist the data owner in the identification of records that violate the rules whilst preserving the privacy of the data. While there are legitimate reasons to fully protect the rules as mentioned earlier, analyzing violating records (also referred to as tuples) in a database may reveal information about the violated rules. However, in an example, the privacy of any rule that is not applicable to the data is preserved. That is, rules relating to data in which no violations occur remain private.

According to an example, inconsistency detection is performed using conditional functional dependencies (CFD) which extend standard functional dependencies (FDs) with pattern tableaux that specify conditions under which the FDs hold. Thus, given a database instance D and a set of CFD rules Σ, an inconsistency detection problem in an example is characterised by determining the set of records D'⊆D that violate Σ.

Figure 1:
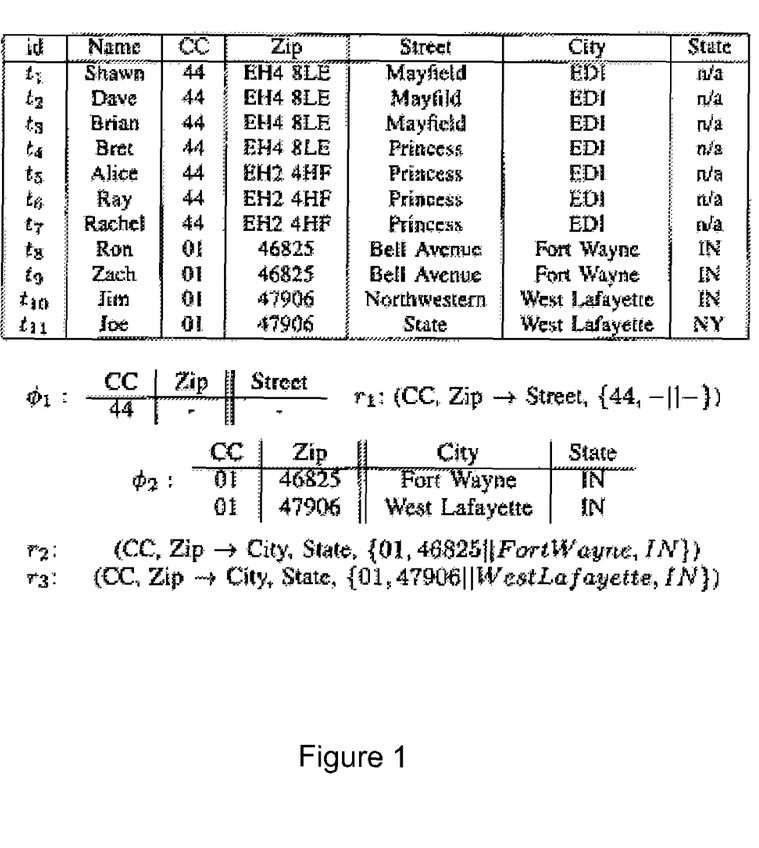
FIG. 1 is a table including a number of exemplary records for a database which relates to customer information.

FIG. 1 is a table including a number of exemplary records for a database which relates to customer information. That is, there is a relation CUSTOMER(Name, CC, Zip, Street, State) from a database D where CC is a country code. FIG. 1 shows the relation and three CFDs, $r_1$, $r_2$ and $r_3$. The rule $r_1$: ([CC=44|zip]→street), states: in the UK (country code, CC=44), the zip code determines the street address. Accordingly, the records $t_1$-$t_4$ in D are not consistent with this rule, but $t_5$-$t_7$ are. Another rule $r_2$:([CC=01, Zip=46825]→[City=FortWayne, State=IN]) is interpreted as: in the US (CC=01), zip code 46825 determines that the address is in the city 'Fort Wayne' and the state 'Indiana'. The records $t_8$ and $t_9$ are consistent with this rule. Similarly, for the rule $r_3$: ([CC=01, Zip=46960]→[City=WestLafayette, State=IN]) the record $t_{10}$ is consistent, but the record $t_{11}$ is not.

However, it may not be possible to discover the rules $r_1$ and $r_3$ in D due to the above-mentioned inconsistent records. That is, there may not be enough support in D to discover these rules. To detect inconsistencies in D, suitable assistance from another party in possession of such rules may thus be required.

According to an example, a system and method for detecting a set of inconsistent records in a database transforms data records and rules into two vectors respectively according to an arrangement of the values from these records and rules. For example, data records can be embedded in a vector space in which a comparison by way of a dot product is performed. Typically, objects can be embedded in such a metric space using multiple different techniques. For example, a coordinate space can be defined in which each axis corresponds to a reference set which is a subset of the objects to be embedded. An example of a method which can be used to map a set of objects into a metric space is described in "Privacy Preserving Schema and Data Matching", Scannapieco, Bertino, Figotin, Elmagarmid, SIGMOD'07, Jun. 12-14, 2007, Beijing, China, the contents of which are incorporated herein by reference in their entirety. An example of a secure dot product scheme is presented in M. Yakout, M. J. Atallah, and A. Elmagarmid, "Efficient private record linkage", In ICDE, 2009, the contents of which are incorporated herein by reference in their entirety.

Computing a dot product of the two vectors yields a measure indicative of whether the data records are inconsistent. To ensure that the content of these two vectors is not leaked to the other party, an efficient secure dot product algorithm which does not rely on cryptographic techniques is used. The result of the secure dot product is that the data records that are inconsistent are delivered to the data owner only. Accordingly, a rules owner learns nothing about the data. Privacy of the rules depends on the level of inconsistency in the data since non-violated rules cannot typically be regenerated. That is, a bulk secure dot product protects the privacy of any non-violated rules.

According to an example, for a relational schema R, a CFD φ is defined as (R: X→Y, $T_p$) where i) (X∪Y)⊆attr(R), and X→Y is a standard FD; and ii) $T_p$ is a pattern tableau for a CFD φ with attributes A∈(X∪Y), where for each entry $t_p \in T_p$, $t_p$[A] is either a constant or an unspecified value '-' (denoted as wildcard); the constant is assumed to be drawn from the discrete domain of attribute A, or simply dom (A).

A pattern tableau is used for uniform representation of both the data and constraints involved in CFD rules. For example, with reference to FIG. 1, the pattern tableaux for CFDs $φ_1$ and $φ_2$ in D are shown at the bottom of the CUSTOMER relation. The pattern tableau $T_p$ contains one or more entries representing different CFD rules. The notations $r_k$ and $r_φ$ are used interchangeably herein in order to represent a rule in the pattern tableau (in order to distinguish a rule from the tuple/data record, $t_i$). If all the attributes in a rule are constants, the rule is a constant CFD. If the rule contains wildcard attributes (both in X and Y), it is considered a variable CFD.

Figure 2:
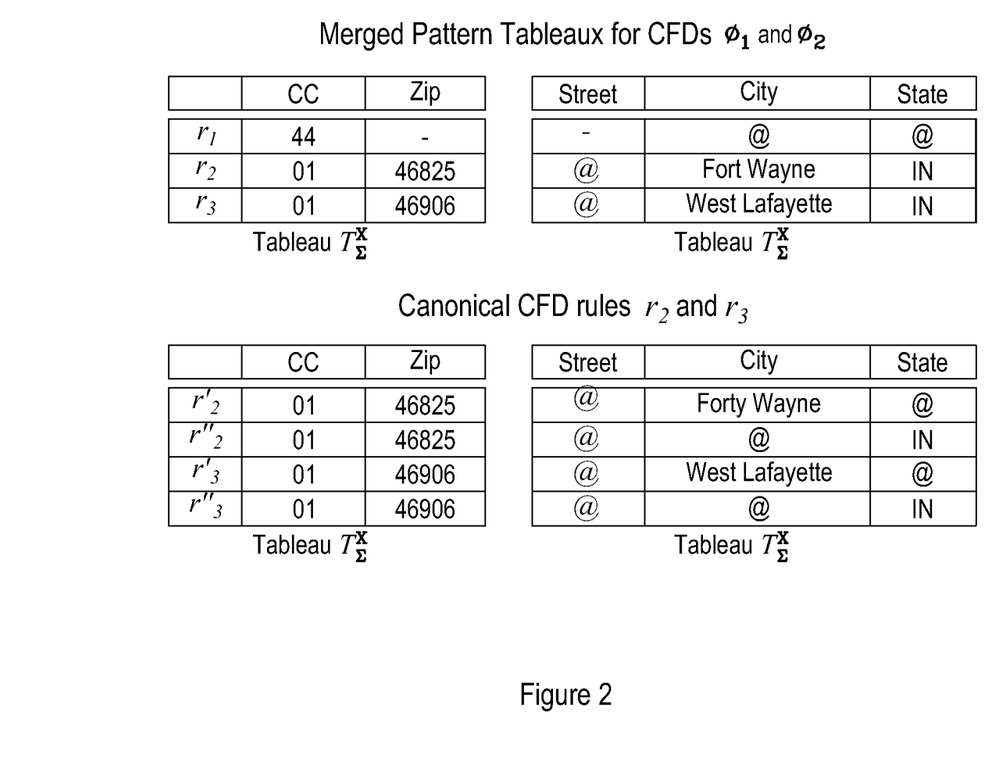
FIG. 2 is a table depicting a set of merged pattern tableaux and CFD rules according to an example.

In an example, a set of CFDs, Σ, are accommodated in the same pattern tableau with the same set of attributes to form a merged pattern tableau denoted $T_Σ$. FIG. 2 is a table depicting a set of merged pattern tableaux and CFD rules according to an example. More specifically, FIG. 2 shows the merged pattern tableaux for CFDs $φ_1$ and $φ_2$ from FIG. 1. The merged pattern tableau is split into two parts, one for the left hand side (LHS) ($T_Σ^X$) and the other for the right hand side (RHS) ($T_Σ^Y$). An attribute that does not apply to a rule is assumed to be a "do not" care value '@' for that specific rule.

According to an example, a relation D of a schema R satisfies a constant CFD rule, $r_k \in T_Σ$ (denoted by D⊨ $r_k$) when the following holds:

for $r_k$ and t∈D if t[X]=$r_k$[X], then t[Y]=$r_k$[Y].

Similarly, D satisfies a variable CFD rule, $r_k \epsilon T_\Sigma$ when the following holds: for $r_k$ and $t_1$, $t_2 \epsilon D$ if $t_1[X]=t_2[X] \asymp r_k[X]$, then $t_1[Y]=t_2[Y] \asymp r_k[Y]$.

The notation $t_1[X]=t_2[X] \asymp r_k[X]$ denotes that for attribute $X_l \epsilon X$, if $r_k[X_l]$ is a constant then $t_1[X_l]$, $t_2[X_l]$ and $r_k[X_l]$ are equal, otherwise (when $r_k[X_l]$ is a wildcard) only $t_1[X_l]$ and $t_2[X_l]$ are equal. If $\Sigma$ is a set of CFD rules, $D \vDash \Sigma$ iff $D \vDash r_k$ for each CFD rule, $r_k \epsilon T_\Sigma$. If some records do not satisfy, or violate, the CFD rule $r_k$, those records are said to be inconsistent with respect to $r_k$.

An inconsistent records set $Y$ is the set of data records in D that violate any CFD rule, $r_k \epsilon T_\Sigma$. That is, $Y \subseteq D$ and $\forall t_i \epsilon Y$, $t_i | \neq T_\Sigma$. The $Y_k$ are the inconsistent records set with respect to a specific rule $r_k \epsilon T_\Sigma$. $Y^C$ represents an inconsistent records set which violate constant CFDs. Similarly, $Y^V$ is the set which violates variable CFDs.

In FIG. 1, the CFD rule $r_1$ matches records $t_1$-$t_7$ in D (a match on CC='44'). The set of records $\{t_1, t_2, t_3, t_4\}$ is denoted D', and the set $\{t_5, t_6, t_7\}$ as D". Referring to FIG. 1, for the rule, $r_1$, $\forall t_i$, $t_j \epsilon D$" the following holds: $t_i[CC, Zip, Street]=t_j[CC, Zip, Street] \asymp r_1[CC, Zip, Street]$. However, $\forall t_i$, $t_j \epsilon D'$ the same does not hold. Therefore, $Y^V(D)=D'$ and $D | \neq r_1$.

According to an example, given a private database D (owned by a data owner) and a set of private CFD rules $\Sigma$ (owned by a rules owner), a system and method returns the set of inconsistent records $D' \subseteq D$ only to the data owner such that D' violates some rules in $\Sigma$, $D' | \neq \Sigma$. In an example, inconsistency detection with constant CFDs and variable CFDs are performed separately. These can be specified as two different queries in a SQL-based detection technique for example.

If $\Sigma_c$ and $\Sigma_v$ represent the constant and variable CFD rule sets privately held by the rules owner ($\Sigma = \Sigma_c \cup \Sigma_v$) then, given a private database D and a private $\Sigma_c$, inconsistency detection with constant CFDs will return the set of inconsistent records $D' \subseteq D$ to the data owner such that $D' | \neq \Sigma_c$. Similarly, inconsistency detection with variable CFDs will return $D' \subseteq D$ such that $D' | \neq \Sigma_v$.

Inconsistency detection is performed between a record (or a record-pair) and a rule. Therefore, two different sub-problems exist, the solution to which are:
1. For a private record t held by a data owner $\mathcal{A}$ and a private constant CFD rule r held by a rules owner $\mathcal{B}$, provide $\mathcal{A}$ with an answer to the question whether $t | \neq r$.
2. For a private pair of record $t_1$ and $t_2$ held by the data owner $\mathcal{A}$ and a private variable CFD rule r held by the rules owner $\mathcal{B}$, provide $\mathcal{A}$ with an answer to the question whether $(t_1, t_2) | \neq r$.

In an example, for a constant CFD task, each record is compared with an individual rule to detect inconsistency, while in a variable CFD task, a pair of records (due to the wildcard attributes in the rule) is compared with an individual rule. That is, inconsistency detection in each task is a combination of two subtasks: (i) identify the record (or the pair of records) that exactly matches the LHS of a rule and (ii) mark the record(s) as inconsistent if there is a mismatch/disagreement among the RHS attribute of the rule and the data record(s).

In each task both $\mathcal{A}$, a data owner, and $\mathcal{B}$, a rules owner, generate appropriate vectors from a data record and a rule and perform a secure dot product with the vectors. The content of both the data and the rule is not revealed to the other party; only the result of the dot product is delivered to $\mathcal{A}$. According to an example, a constant CFD task performs an individual inconsistency detection as a two step process (two secure dot products), and a variable CFD task performs the same as a single step process (one secure dot product). These two tasks accumulate the set of inconsistent records $Y^C$ and $Y^V$, respectively.

Figure 3:
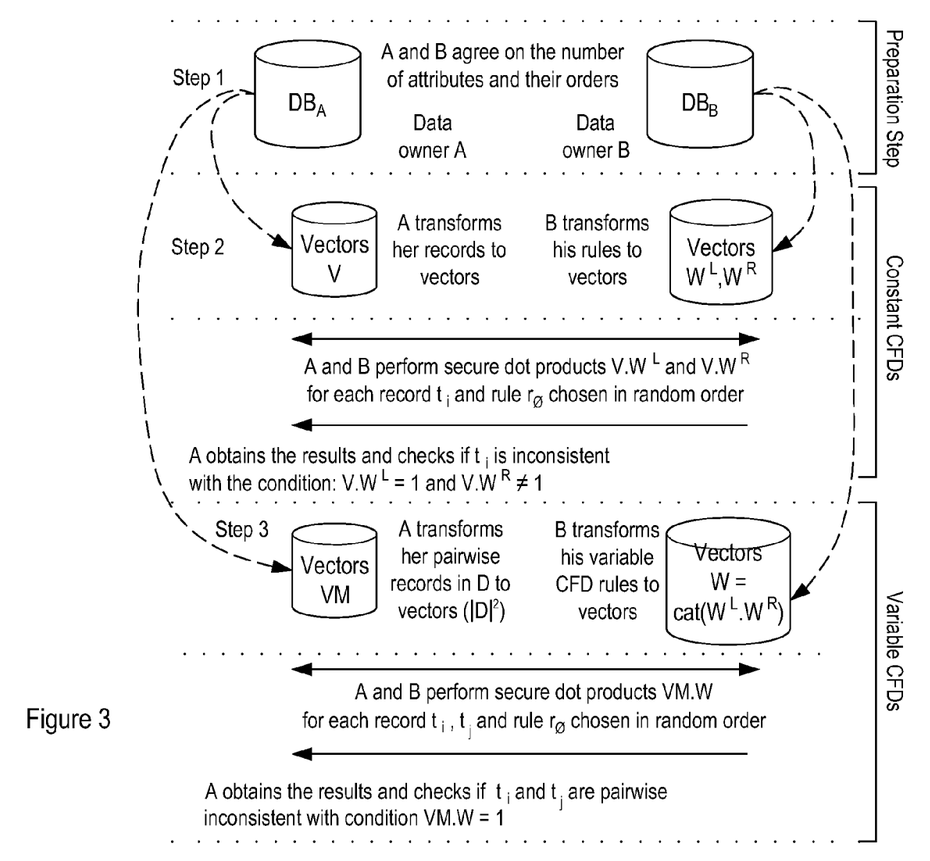
FIG. 3 is a schematic block diagram of a method according to an example.

FIG. 3 is a schematic block diagram of a method according to an example. In an example, it is assumed that i) $\mathcal{A}$ and $\mathcal{B}$ have the same schema R; ii) $\mathcal{B}$ has union compatible canonical CFD rules and a merged pattern tableaux $T_\Sigma$ (split into tableaux $T_\Sigma^X$ and $T_\Sigma^Y$); and iii) $\mathcal{A}$ and $\mathcal{B}$ agree on a set of attributes to operate on during the whole procedure. Step 1 in FIG. 3 denotes this agreement and preparation step.

In an example, fixed length hash codes of the attribute values are used instead of the actual values. The value h(a) denotes the hash code of the attribute value a. The hash codes are used to achieve communication and storage efficiency, but not as a security measure. Typically, 32 bit hash codes can be used without any collisions.

Each entry in a merged pattern tableau is denoted as $r_\phi(X \rightarrow Y) \epsilon T_\Sigma$. X (Y) constitutes the union of LHS (RHS, respectively) attributes of all CFD rules. X u Y is the set of attributes $\mathcal{A}$ and $\mathcal{B}$ mutually agreed on. X' and Y' refer to the LHS and RHS attributes with constant values, whilst X" and Y" denote the LHS and RHS attributes with wildcards. For example, for rule $r_1$ in FIG. 1, X'={CC}, X"={Zip}, Y'=Ø and Y"={Street}. Note that X–(X'∪X") and Y–(Y'∪Y") are the attributes with '@'. In an example, the canonical form for CFD rules, where the RHS contains only one attribute (either constant or wildcard), i.e., |Y|=1 is considered. For example, FIG. 2 shows two rules in the canonical form. Thus, for a record $t_i$ and a rule $r_3$, $(t_i | \neq r_2' \vee t_i | \neq r_2'')$ and $t_i | \neq r_2$ are equivalent.

For the constant CFD task, $\mathcal{A}$ has a data record $t_i$ and $\mathcal{B}$ has a constant CFD rule $r_\phi$. $\mathcal{A}$ wants to know whether $t_i | \neq r_\phi$ privately. A process for inconsistency detection using constant CFDs is shown below.

Method for Constant CFDs

Input: The record, $t_i \epsilon D$ held by $\mathcal{A}$, and the constant CFD rule, $r_\phi \epsilon T_\Sigma$ held by $\mathcal{B}$ Output: Inconsistent records set $Y^C$ (a) $\mathcal{A}$ generates a vector V of length $X \cup Y$ for $t_i$, where the k-th component of V is $V_k = h(t_i[x_k])$, $\forall x_k \epsilon X \cup Y$ (b) $\mathcal{B}$ generates a vector $W^L$ for LHS of $r_\phi$, where the k-th component of $W^L$:

$$W_k^L = \frac{h(r_\phi[x_k])}{\sum_{\forall x_l \epsilon X'} h(r_\phi[x_l])^2}, \quad \forall x_k \in X'$$
$$= 0, \quad \text{otherwise.}$$

Similarly, $\mathcal{B}$ generates another vector $W^R$ for RHS of $r_\phi$ such that $$W_k^R = \frac{1}{r_\phi[y_k]}, \quad \text{for } y_k \in Y'$$
$$= 0, \quad \text{otherwise.}$$

(c) $\mathcal{A}$ and $\mathcal{B}$ perform secure dot products for $V \cdot W^L$ and $V \cdot W^R$ and $\mathcal{A}$ obtains the results (d) $\mathcal{A}$ checks if $t_i$ is inconsistent and inserts into $Y^C$:
If $V \cdot W^L=1$ and $V \cdot W^R \neq 1$ then:
$Y^C \leftarrow Y^C \cup \{t_i\}$ The individual components of the vector $V_L$ contain the hash codes of all the attribute values $X \cup Y$. $\mathcal{B}$ then generates a vector $W^L$ from the hash codes of the CFD rule $r_\phi$ (Step (b)). The k-th component $W_k^L$ corresponds to $$\frac{h(r_\phi[x_k])}{\sum_{\forall x_l \in X'} h(r_\phi[x_l])^2}$$

when the attribute $x_k$ has a constant on the LHS of the rule, i.e., $x_k \in X'$, and to 0, when $x_k \in X'$. Similarly, $\mathcal{B}$ generates $W^R$ with the RHS constants of the rule.

In an example, a first dot product is $V \cdot W^L$, which equals to 1 if the data record and LHS constants of the rule match exactly, or $t_i[x_k]=r_\phi[x_k]$, $\forall x_k \in X'$.
This is because $$V \cdot W^L = \frac{\sum_{\forall x_k \in X'} h(t_i[x_k]) \times h(r_\phi[x_k])}{\sum_{\forall x_k \in X'} h(r_\phi[x_k])^2}.$$

The second dot product is $V \cdot W^R$, which equals to 1, if the data record and RHS constants of the rule do not match. Hence, $\mathcal{A}$ learns that $t_i | \neq r_\phi$, if $V \cdot W^L = 1$ and $V \cdot W^R \neq 1$.

Figure 4:
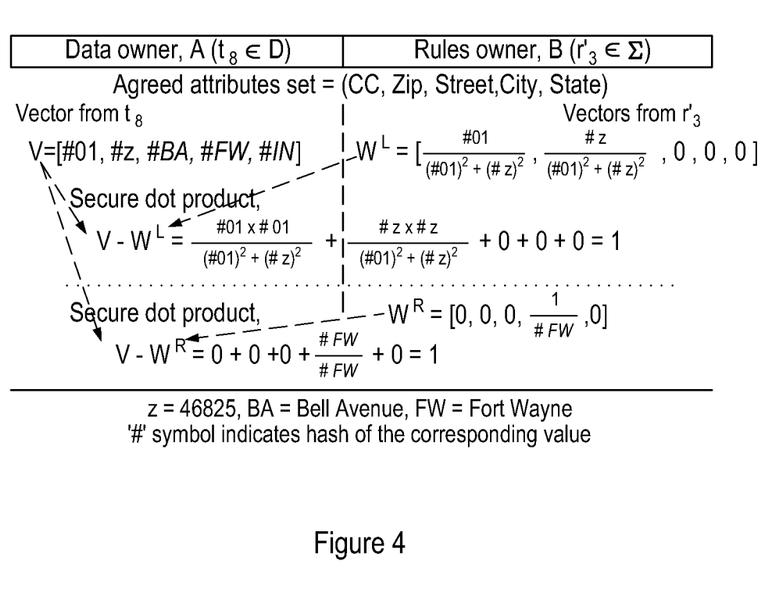
FIG. 4 shows an example of inconsistency detection with a constant CFD according to an example.

FIG. 4 shows an example of inconsistency detection with a constant CFD rule $r_3'' \in T_\Sigma$ and the data record $t_{11} \in D$ from FIG. 1. The '#' symbol is used to denote the hash codes of the values. The result of the dot products, $V \cdot W^L = 1$ and $V \cdot W^R \neq 1$. Therefore, $t_{11}$ is inconsistent with respect to the rule $r_3''$.

For a variable CFD task, $\mathcal{A}$ has a pair of records $t_i, t_j$ and $\mathcal{B}$ has a variable CFD rule $r_\phi$. $\mathcal{A}$ wants to know whether $t_i, t_j | \neq r_\phi$, privately. We transform this problem into the computation of a single dot product as described below. Knowing the dot product result, $\mathcal{A}$ knows whether $t_i, t_j | \neq r_\phi$.

Method for Variable CFDs

Input: The records $t_i, t_j \in D$ held by $\mathcal{A}$, and the variable CFD rule, $r_\phi \in T_\Sigma$ held by $\mathcal{B}$ Output: Inconsistent records set $Y^V$ (a) $\mathcal{A}$ generates a vector VM of length $2|X \cup Y|$, which is the concatenation of the record vector V and the matching vector M. V contains hash codes of either $t_i$ or $t_j$. The k-th component of V (choosing $t_i$) is:

$V_k = VM_k = h(t_i[x_k]), \forall x_k \in X \cup Y$ and, the k-th component of M for the data records $t_i$ and $t_j$ is:

$$M_k = VM_{2k} = 1, \text{ if } t_i[x_k] = t_j[x_k]$$
$$= 0, \text{ otherwise}$$

(b) $\mathcal{B}$ generates three random scalars $s_1$, $s_2$ and $s_3$ and a vector W of length $2|X \cup Y|$. W is generated by concatenating two vectors $W^L$ and $W^R$, i.e. $W = \text{concat}(W^L, W^R)$:

$$W_k^L = \frac{(s_1 - s_2 + 1) \times h(r_\phi[x_k])}{\sum_{\forall x_l \in X'} h(r_\phi[x_l])^2}, \quad \forall x_k \in X'$$
$$= 0, \quad \text{otherwise.}$$

And, $$W_k^R = \frac{s_2 - s_1}{|X' \cup X''|}, \quad \forall x_k \in X' \cup X''$$
$$= s_3, \quad \text{for } y_k \in Y''$$
$$= 0 \quad \text{otherwise.}$$

(c) $\mathcal{A}$ and $\mathcal{B}$ perform the secure dot product $VM \cdot W$
(d) $\mathcal{A}$ checks if $t_i$ and $t_j$ are inconsistent and inserts into $Y^V$: if $VM \cdot W = 1$ then $Y^V \leftarrow Y^V \cup \{t_i, t_j\}$ Accordingly, in Step (a), for a pair of records $t_i$ and $t_j$, $\mathcal{A}$ generates a record vector V with the hash codes of the attributes values of either $t_i$ or $t_j$ (randomly chosen by $\mathcal{A}$ in an example). Then, $\mathcal{A}$ generates a matching vector M, such that the k-th component, $M_k$, is set to 1 if the k-th attribute values of $t_i$ and $t_j$ exactly match, that is $t_i[x_k]=t_j[x_k]$, otherwise 0. Then, $\mathcal{A}$ generates a vector VM by concatenating V and M. The length of the vector VM is double the size of V, i.e., $2|X \cup Y|$.

In Step (b), $\mathcal{B}$ generates vector W for rule $r_\phi$ of the same length as VM. W can also be split into LHS ($W^L$) and RHS ($W^R$) parts. $W^L$ is the same as the vector $W^L$ described in the constant CFD task above, except that each term is multiplied by the term $(s_2 - s_1 + 1)$, where $s_1$ and $s_2$ are random scalars generated by $\mathcal{B}$. If the k-th component of the vector $W^R$ is a LHS constant or wildcard, it contains $(s_1 - s_2)/|X \cup X''|$. For a RHS wildcard it contains a random scalar $s_3$, otherwise 0. In other words, the random value $(s_1 - s_2)$ is equally split among the LHS constants or wildcards of the rule. Finally, the result of the dot product $VM \cdot W$ equals to 1, if $(t_i, t_j) | \neq r_\phi$, otherwise, $VM \cdot W$ equals to a random scalar.

Figure 5:
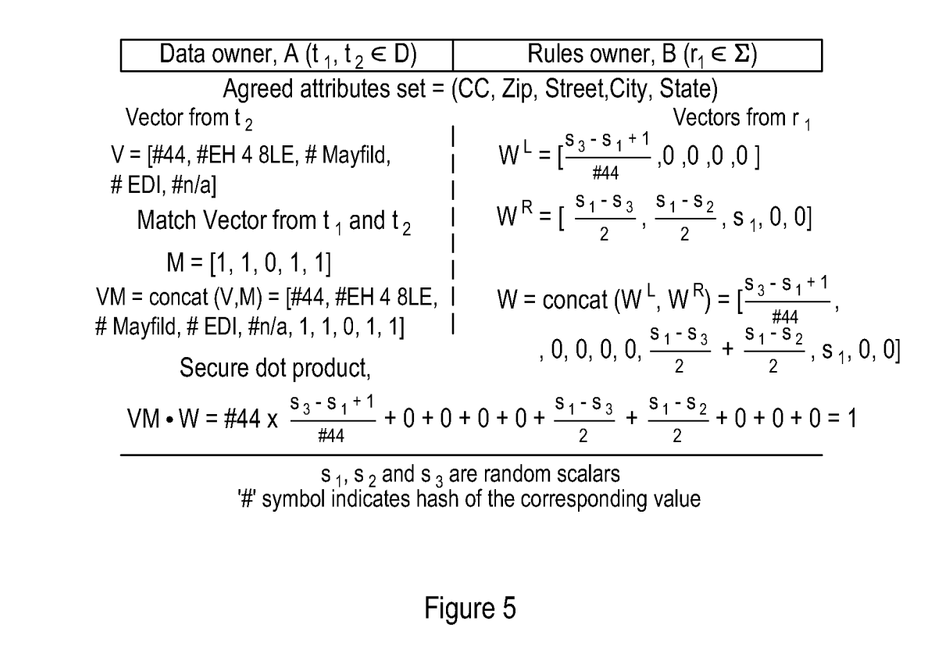
FIG. 5 shows an example of inconsistency detection with a variable CFD according to an example.

FIG. 5 shows an example of inconsistency detection with a variable CFD rule $r_1 \in T_\Sigma$ and the data record $t_1, t_2 \in D$. The '#' symbol is used to denote the hash codes of the values. The result of the dot product, $VM \cdot W$ is 1. Therefore, $t_1, t_2$ are inconsistent with respect to the rule $r_1$.

According to an example, a secure dot product process operates according to a known technique such as the following:

Inputs: $\mathcal{A}$ and $\mathcal{B}$ have d-dimensional vectors V and W respectively, and the security parameter k.

Output: $\mathcal{A}$ learns $V \cdot W$.

Protocol Steps:

1) $\mathcal{B}$ generates k−1 linearly independent random vectors $W^{(1)}, W^{(2)}, \ldots, W^{(k-1)}$, and computes $W^{(k)} = W - W^{(1)} - W^{(2)} - \ldots - W^{(k-1)}$.

2) For each $j = 1, k$, $\mathcal{B}$ computes a random scalar $\alpha_j$ and creates vector $X_j = \alpha_j W^{(j)}$. $X_1, X_2, \ldots, X_k$ are sent to $\mathcal{A}$.

3) $\mathcal{A}$ generates random scalars $\beta$ and $\beta'$, and k random vectors $Y_1, Y_2, \ldots, Y_k$ where $Y_j$ is orthogonal to $X_j$, $j=1, \ldots, k$. $\mathcal{A}$ sends $\mathcal{B}$ the k vectors $Z_j = \beta V + \beta' X_j + Y_j$, $j=1, \ldots, k$.

4) $\mathcal{B}$ computes and sends $\mathcal{A}$ the scalars, U and U':

$U = \alpha_1 W^{(1)} \cdot W^{(1)} + \ldots + \alpha_k W^{(k)} \cdot W^{(k)}$ $U' = Z_1 \cdot W^{(1)} + Z_2 \cdot W^{(2)} + \ldots + Z_k \cdot W^{(k)}$ 5) $\mathcal{A}$ computes $(U' - \beta' U)/\beta$, which equals the desired $V \cdot W$, because $$U' = Z_1 \cdot W^{(1)} + Z_2 \cdot W^{(2)} + \ldots + Z_k \cdot W^{(k)}$$
$$= (\beta V + \beta' X_1 + Y_1) \cdot W^{(1)} + \ldots + (\beta V + \beta' X_k + Y_k) \cdot W^{(k)}$$
$$= \beta V \cdot (W^{(1)} + \cdots + W^{(k)}) + \beta' X_1 \cdot W^{(1)} + \ldots + \beta' X_k \cdot W^{(k)}$$
$$= \beta V \cdot W + \beta' \alpha_1 W^{(1)} \cdot W^{(1)} + \ldots + \beta' \alpha_k W^{(k)} \cdot W^{(k)}$$
$$= \beta V \cdot W + \beta' U$$

This simplification of U' is possible since $Y_j$ is orthogonal to $W^{(j)}$.

The security parameter k controls the degree at which the original vectors are hidden. Using this parameter, the original vectors are hidden in a k-dimensional hyperplane. Note that $\mathcal{A}$ learns only i) a k-dimensional hyperplane that contains W and that is selected (Step 1) by $\mathcal{B}$; and ii) the scalar U (Step 4). For i), the larger the value of k the higher the privacy is guaranteed for $\mathcal{B}$. For ii), since all of the $\alpha_j$'s are unknown to $\mathcal{A}$, $\mathcal{A}$ cannot learn much from U.

In Step 3, $\mathcal{B}$ knows $X_j$, but not the scalars $\beta$, $\beta'$, or the vectors $Y_j$, which hide V from $\mathcal{B}$. Indeed, $\mathcal{A}$ is effectively adding a random vector of $\mathcal{A}$'s choice to V for hiding it. Note that without the $\beta'X_j$, $\mathcal{B}$ could obtain the direction of V in space, but not its magnitude, by computing the k dot products $Z_j \cdot W^{(j)} = \beta V \cdot W^{(j)}$; their ratios would reveal that direction, as $\beta$ cancels out.

In an example values of k equal to 2, 4 and 6, (d=10 and 20) can be used, but typically a value of k of 2 is enough, e.g., when d is large a smaller k is possible because enough coordinates exist to make reconstruction harder. Other values for parameter k are of course possible dependent on the nature of the database under consideration.

Accordingly, one party does not learn the vector of the other party during the exchange of the intermediate vectors in the protocol steps. As mentioned earlier, $\mathcal{A}$ learns only a k-dimensional hyperplane containing W and the scalar U which does not reveal W. In other words, the rule is not learnt through the protocol. On the other hand, $\mathcal{B}$ learns nothing about V. Therefore, $\mathcal{B}$ does not learn the data record from $\mathcal{A}$ during the exchange.

As mentioned, a data owner $\mathcal{A}$ may be able to regenerate violated rules from a group of inconsistent records. Since the processes described above describe an individual dot product between a record (or a record-pair) and a rule, if the dot products of all the records and the rules were to be performed in this way, $\mathcal{A}$ may learn most of the inconsistent records without having to wait for all the dot product results. After knowing that some of the records are already inconsistent and assuming a semi-honest setting, $\mathcal{A}$ may become interested in carefully perturbing some of the original data records to obtain more violations and hence drive an attack on B. Very good guesses may even lead to violations with respect to some rules that did not violate the original set of data records in the first place. In other words, $\mathcal{A}$ may be able to learn rules beside the violated ones. One way to prevent this driving attack is to use a bulk version of the secure dot product (SDP).

More specifically, each step of the SDP can involve operations on all the data vectors and the rule vectors at once. Therefore, $\mathcal{A}$ now has to wait until Step 5 of SDP to obtain all the dot product results at once. In addition, if the rules are always paired in the same order with data records during the bulk SDP, $\mathcal{A}$ would precisely learn the specific order of a rule that is matched (in the case of a constant CFD) or violated by the records. Now, $\mathcal{A}$ can easily group the records that relate only to that specific rule and perform the rule regeneration more easily. Such attacks can be countered in an example by randomizing the order of the rules paired with each record or pair of records.

Figure 6:
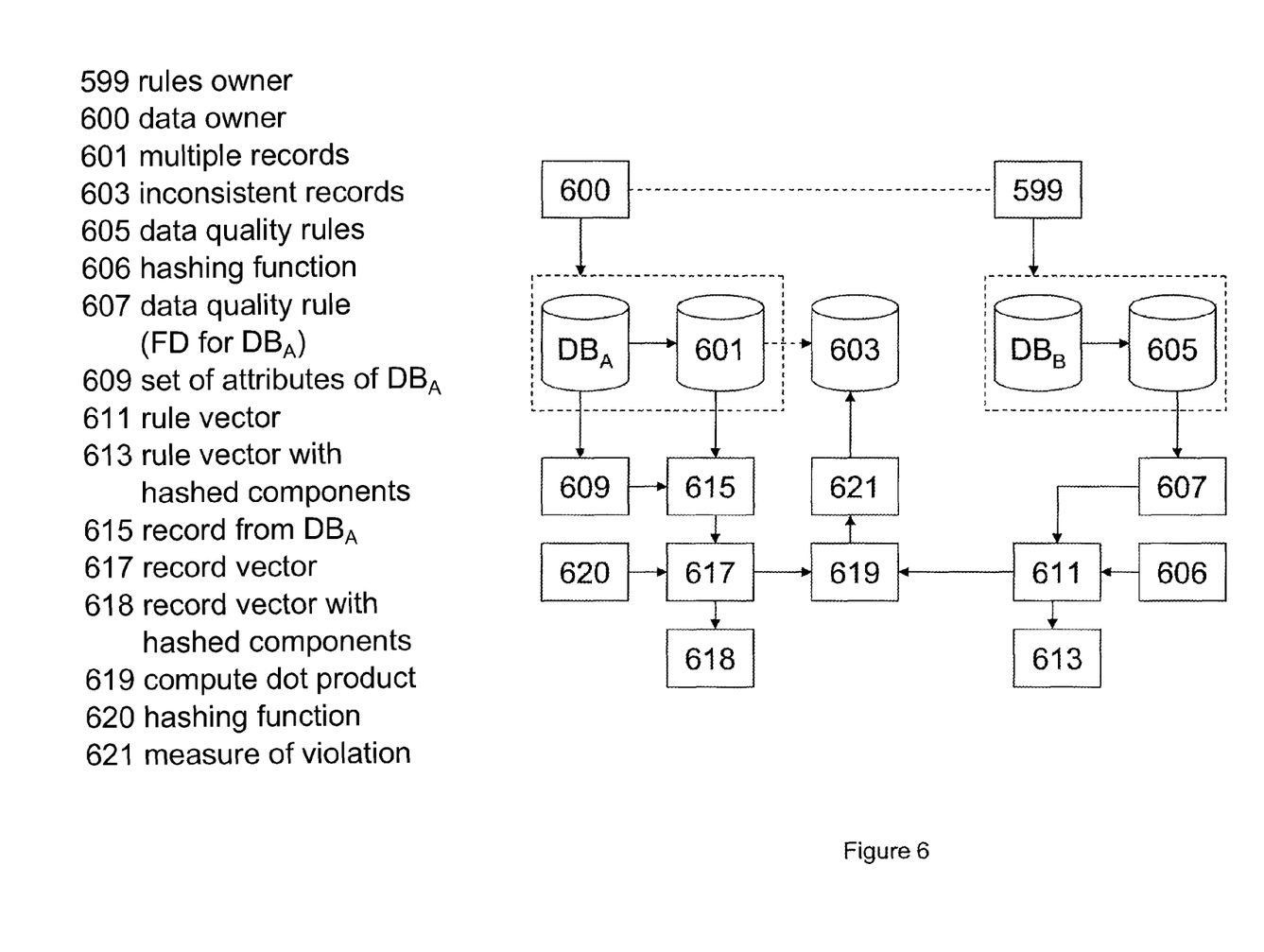
FIG. 6 is a flow chart of a method according to an example.

FIG. 6 is a flow chart of a method according to an example. A database $DB_A$ owned by a data owner 600 includes multiple records 601. A collection of data quality rules $DB_B$ owned by a rules owner 599 is provided. The rules owner and data owner will collaborate in an example in order to exchange certain information in order to determine the proportion 603 of the multiple records 601 which include inconsistent data. That is, given a set of data quality rules 605 for the database $DB_A$, there is a set of records 603 which violate the rules. In order to detect the set of inconsistent records 603, a data quality rule 607 which represents a functional dependency for the database $DB_A$ is selected. The selected rule is transformed into a rule vector 611 comprising hashed components 613. That is, attribute values making up the rule 607 can be coded with a hash function 606. In block 609, a set of attributes of database $DB_A$ are selected. A record 615 from the multiple records 601 is selected from the database $DB_A$ on the basis of the selected attributes and transformed into a vector 617 with hashed components 618. A hashing function 620, which is typically the same as function 606, is used to encode components of the vector 617 to hashcodes 618. Vectors 615 and 611 are processed in block 619 in order to compute a dot product which is used to generate a measure 621 representing violation of the data quality rule 607 by the record 615.

Figure 7:
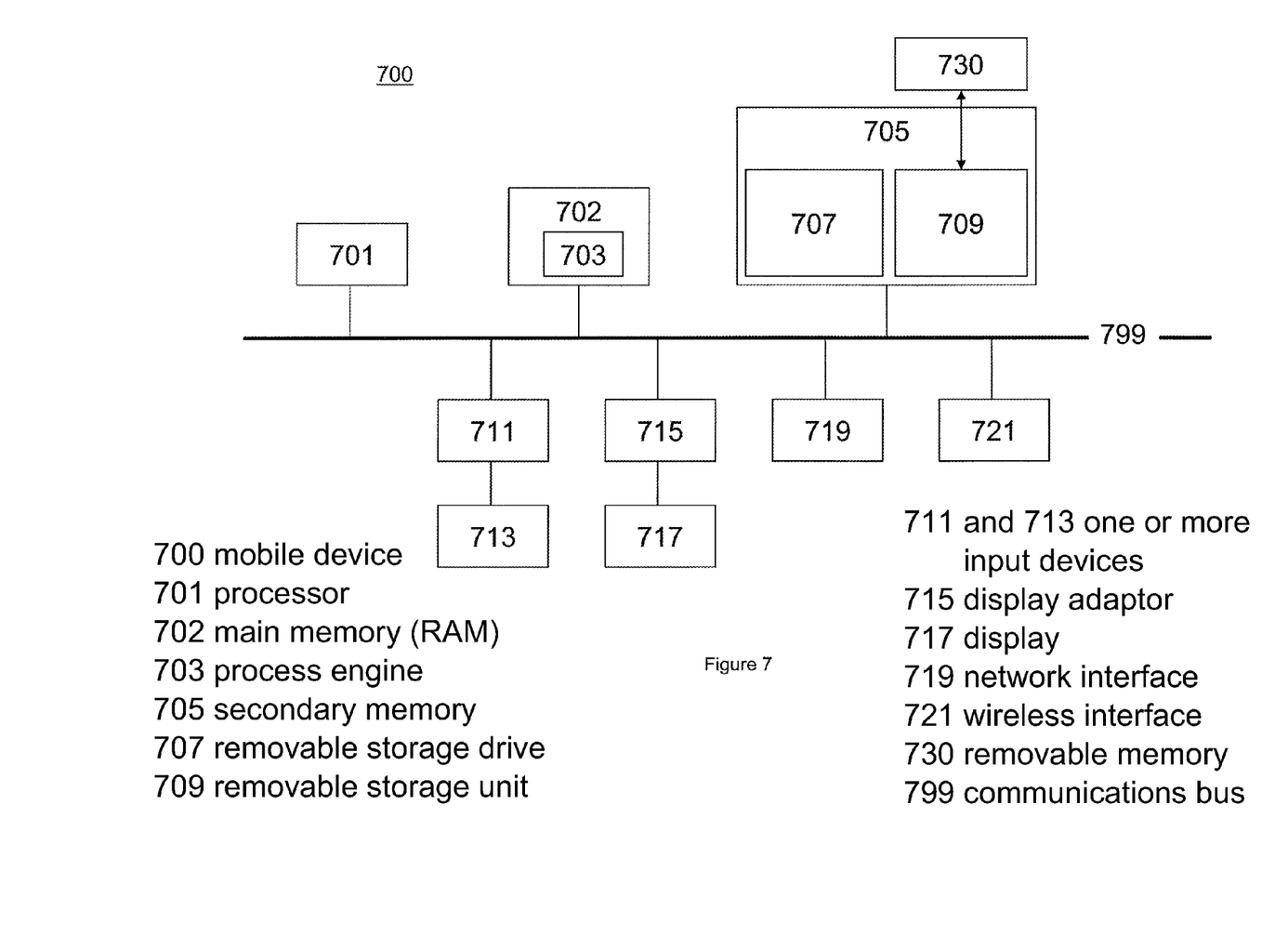
FIG. 7 is a schematic block diagram of a system according to an example.

FIG. 7 is a schematic block diagram of a system according to an example suitable for implementing any of the methods or processes described above. Apparatus 700 can be a mobile device such as a smart device in the form of a mobile telephone or tablet device for example. Apparatus 700 includes one or more processors, such as processor 701, providing an execution platform for executing machine readable instructions such as software. Commands and data from the processor 701 are communicated over a communication bus 799. The system 700 also includes a main memory 702, such as a Random Access Memory (RAM), where machine readable instructions may reside during runtime, and a secondary memory 705. The secondary memory 705 includes, for example, a hard disk drive 707 and/or a removable storage drive 730, representing a floppy diskette drive, a magnetic tape drive, a compact disk drive, etc., or a nonvolatile memory where a copy of the machine readable instructions or software may be stored. The secondary memory 705 may also include ROM (read only memory), EPROM (erasable, programmable ROM), EEPROM (electrically erasable, programmable ROM). In addition to software, data representing any one or more of a database, record, attribute, tuple, rule or tableau for example may be stored in the main memory 702 and/or the secondary memory 705. The removable storage drive 730 reads from and/or writes to a removable storage unit 709 in a well-known manner. A inconsistent record detection engine 703 can reside in memory 702 for example, such that apparatus 700 is an inconsistent record detector. Accordingly, engine 703 is operable to implement a method or process as described herein.

A user can interface with the system 700 with one or more input devices 711, such as a keyboard, a mouse, a stylus, touch-enabled screen or interface and the like in order to provide user input data. The display adaptor 715 interfaces with the communication bus 799 and the display 717 and receives display data from the processor 701 and converts the display data into display commands for the display 717. A network interface 719 is provided for communicating with other systems and devices via a network (not shown). The system can include a wireless interface 721 for communicating with wireless devices in the wireless community.

It will be apparent to one of ordinary skill in the art that one or more of the components of the system 700 may not be included and/or other components may be added as is known in the art. The apparatus 700 shown in FIG. 7 is provided as an example of a possible platform that may be used, and other types of platforms may be used as is known in the art. One or more of the steps described above may be implemented as instructions embedded on a computer readable medium and executed on the system 700. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

What is claimed is:

1. A computer-implemented method for detecting a set of inconsistent data records in a database including multiple records, comprising:
    selecting a data quality rule representing a functional dependency for the database;
    transforming the data quality rule into at least one rule vector with hashed components,
        wherein transforming the data quality rule includes generating at least a pair of vectors,
        wherein the at least one rule vector is determined by concatenating left and right hand side components of the data quality rule,
        wherein the data quality rule is a conditional functional dependency (CFD) representing a functional dependency of the database, and wherein the CFD is a constant or variable CFD including rule attributes which are constants or variables, and wherein a pair of records of the database is transformed into the record vector;
    selecting a set of attributes of the database;
    transforming at least one record of the database selected on the basis of the selected attributes into a record vector with hashed components wherein the hashed components of the at least one rule vector and the record vector prepare the vectors for computing a secured dot product;
    computing a dot product of the rule and record vectors to generate a measure representing violation of the data quality rule by the record, wherein the measure representing violation of the data quality rule by the record is provided only to the owner of the database; and
    detecting the set of inconsistent data records in the database using the generated measure.

2. The computer-implemented method as claimed in claim 1, wherein hashed components of the vectors are fixed-size hashcodes.

3. The computer-implemented method as claimed in claim 1, wherein the data quality rule is a conditional functional dependency (CFD) representing a functional dependency of the database which is extended with a pattern tableau specifying conditions under which the functional dependency holds for records of the database.

4. The computer-implemented method as claimed in claim 1, wherein the data quality rule is a conditional functional dependency (CFD) representing a functional dependency of the database which is extended with a pattern tableau specifying conditions under which the functional dependency holds for records of the database, and wherein the CFD is a constant CFD including rule attributes which are constants.

5. The computer-implemented method as claimed in claim 1, wherein the data quality rule is a conditional functional dependency (CFD) representing a functional dependency of the database which is extended with a pattern tableau specifying conditions under which the functional dependency holds for records of the database, and wherein the CFD is a variable CFD including rule attributes which are variable.

6. The computer-implemented method as claimed in claim 1, wherein the data quality rule is a conditional functional dependency (CFD) representing a functional dependency of the database which is extended with a pattern tableau specifying conditions under which the functional dependency holds for records of the database, and wherein the record includes an attribute matching a corresponding determinant attribute for the CFD.

7. The computer-implemented method as claimed in claim 1, wherein the data quality rule is a conditional functional dependency (CFD) representing a functional dependency of the database which is extended with a pattern tableau specifying conditions under which the functional dependency holds for records of the database, and wherein the record includes an attribute matching a corresponding determinant attribute for the CFD, and wherein a violation occurs if there is a disagreement between a dependent attribute of the record and the corresponding attribute of the CFD.

8. The computer-implemented method as claimed in claim 1, wherein the privacy of a data quality rule is preserved in the case where it is not violated by the records.

9. The computer-implemented method as claimed in claim 1, wherein transforming the data quality rule includes generating a pair of vectors for a rule representing components for the left and right hand sides of the rule, and wherein the pair of vectors for a data quality rule which is a variable conditional functional dependency are concatenated to form a single vector.

10. A computer program embedded on a non-transitory tangible computer readable storage medium, the computer program including machine readable instructions that, when executed by a processor, implement a method for detecting a set of inconsistent data records in a database including multiple records, comprising:
    selecting a data quality rule representing a functional dependency for the database;
    transforming the data quality rule into at least one rule vector with hashed components,
        wherein transforming the data quality rule includes generating at least a pair of vectors,
        wherein the at least one rule vector is determined by concatenating left and right hand side components of the data quality rule,
        wherein the data quality rule is a conditional functional dependency (CFD) representing a functional dependency of the database, and wherein the CFD is a constant or variable CFD including rule attributes which are constants or variables, and wherein a pair of records of the database is transformed into the record vector;
    selecting a set of attributes of the database;
    transforming at least one record of the database selected on the basis of the selected attributes into a record vector with hashed components, wherein the hashed components of the at least one rule vector and the record vector prepare the vectors for computing a secured dot product;

computing a dot product of the rule and record vectors to generate a measure representing violation of the data quality rule by the record, wherein the measure representing violation of the data quality rule by the record is provided only to the owner of the database; and detecting the set of inconsistent data records in the database using the generated measure.

11. The computer program embedded on the non-transitory tangible computer readable storage medium as claimed in claim 10, the computer program including machine readable instructions that, when executed by a processor, implement a method for detecting a set of inconsistent data records in a database including multiple records, wherein:

wherein transforming the data quality rule includes generating a pair of vectors for a rule representing components for the left and right hand sides of the rule, and wherein the pair of vectors for a data quality rule which is a variable conditional functional dependency are concatenated to form a single vector.

* * * * *